United States Patent [19]

Staheli

[11] Patent Number: 4,921,671

[45] Date of Patent: May 1, 1990

[54] METHOD FOR MOLDING ARTICLES TO A WEB

[76] Inventor: Edward O. Staheli, 12711 Beverly Park Rd., Lynwood, Wash. 98037

[21] Appl. No.: 219,925

[22] Filed: Jul. 15, 1988

[51] Int. Cl.$^5$ .................. B28B 11/14; B28B 11/18; B29C 45/14; B29C 45/40
[52] U.S. Cl. .................................. 264/145; 264/156; 264/160; 264/161; 264/251; 264/257; 264/273; 425/122; 425/129.1
[58] Field of Search ............... 264/145, 160, 161, 153, 264/251, 257, 273, 156; 425/122, 129.1, 5

[56] References Cited

U.S. PATENT DOCUMENTS 2,965,932 12/1960 Knowles .......................... 264/297.5
3,755,522 8/1973 Jope et al. ............................ 264/163

Primary Examiner—Jan H. Silbaugh
Assistant Examiner—Catherine Timm
Attorney, Agent, or Firm—Don R. Mollick

[57] ABSTRACT

A method and apparatus for producing molded articles attached to a flexible web by molding the articles in the cavity of a mold which includes entrances for the web and elements for centering the web in the cavity. Structures are provided to trim waste from the molded article and automatically advance the web upon opening of the cavity. Elements are provided to separate articles with a predetermined length of web material attached.

7 Claims, 3 Drawing Sheets

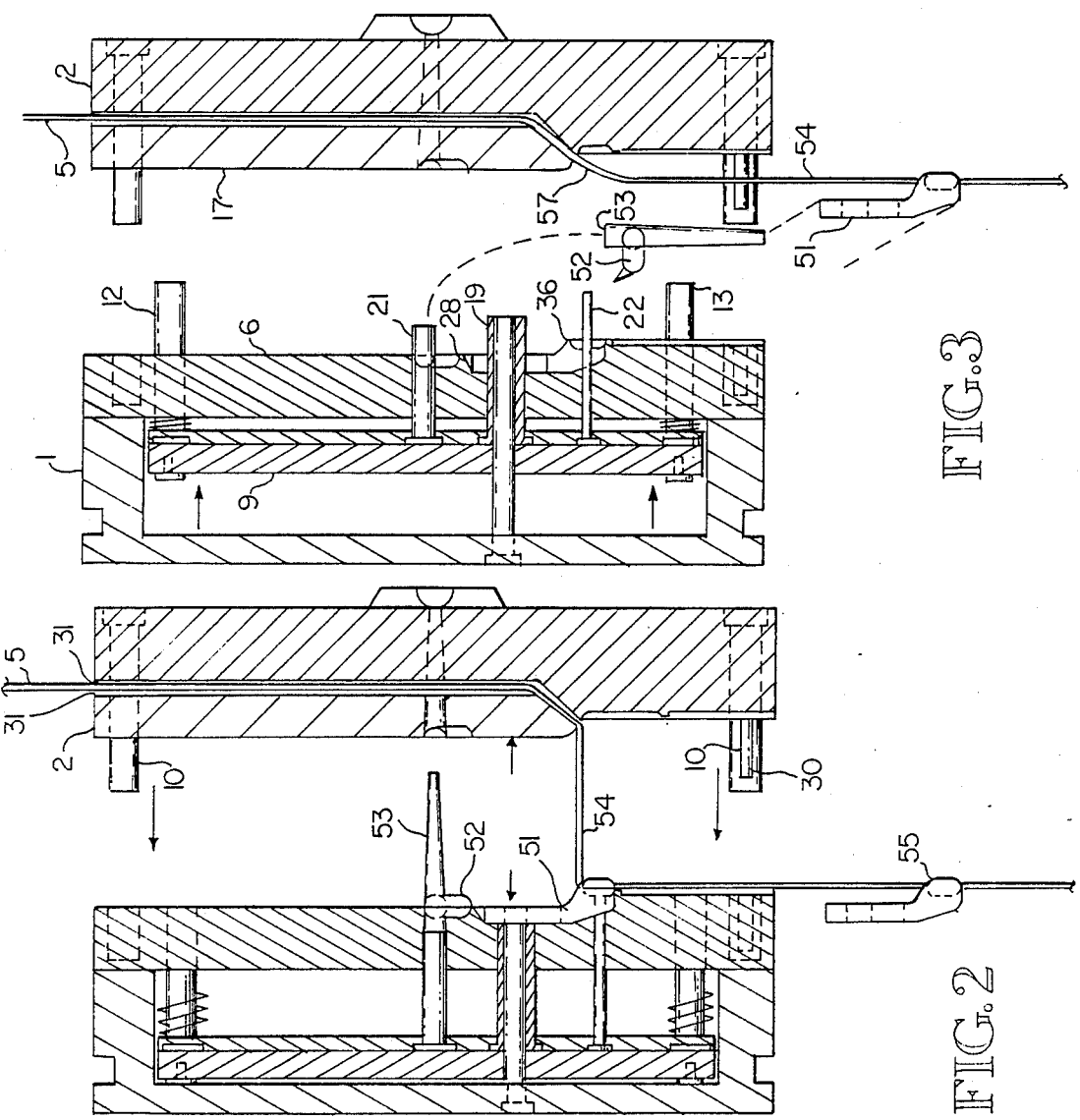
FIG. 3
FIG. 2
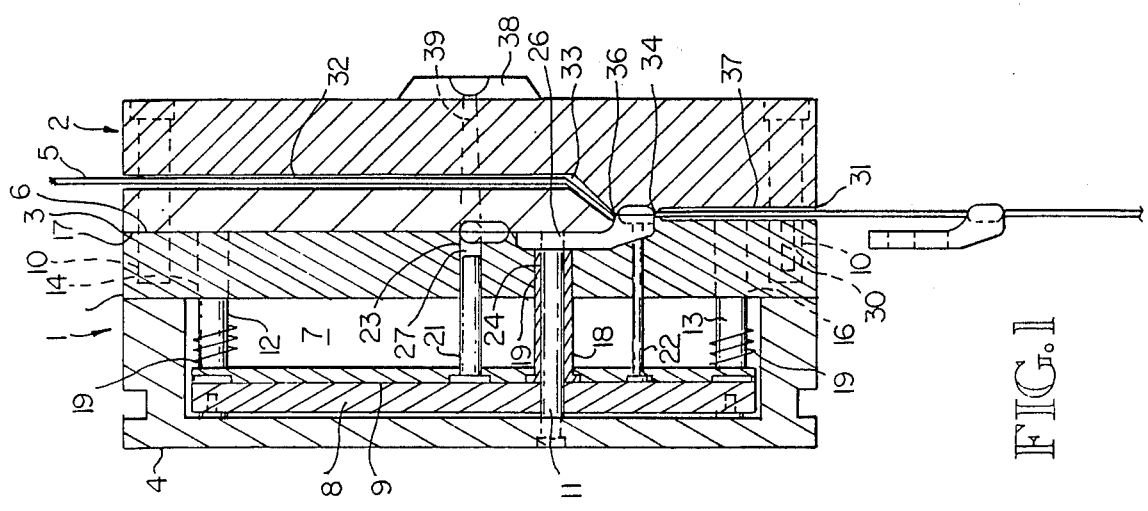
FIG. 1

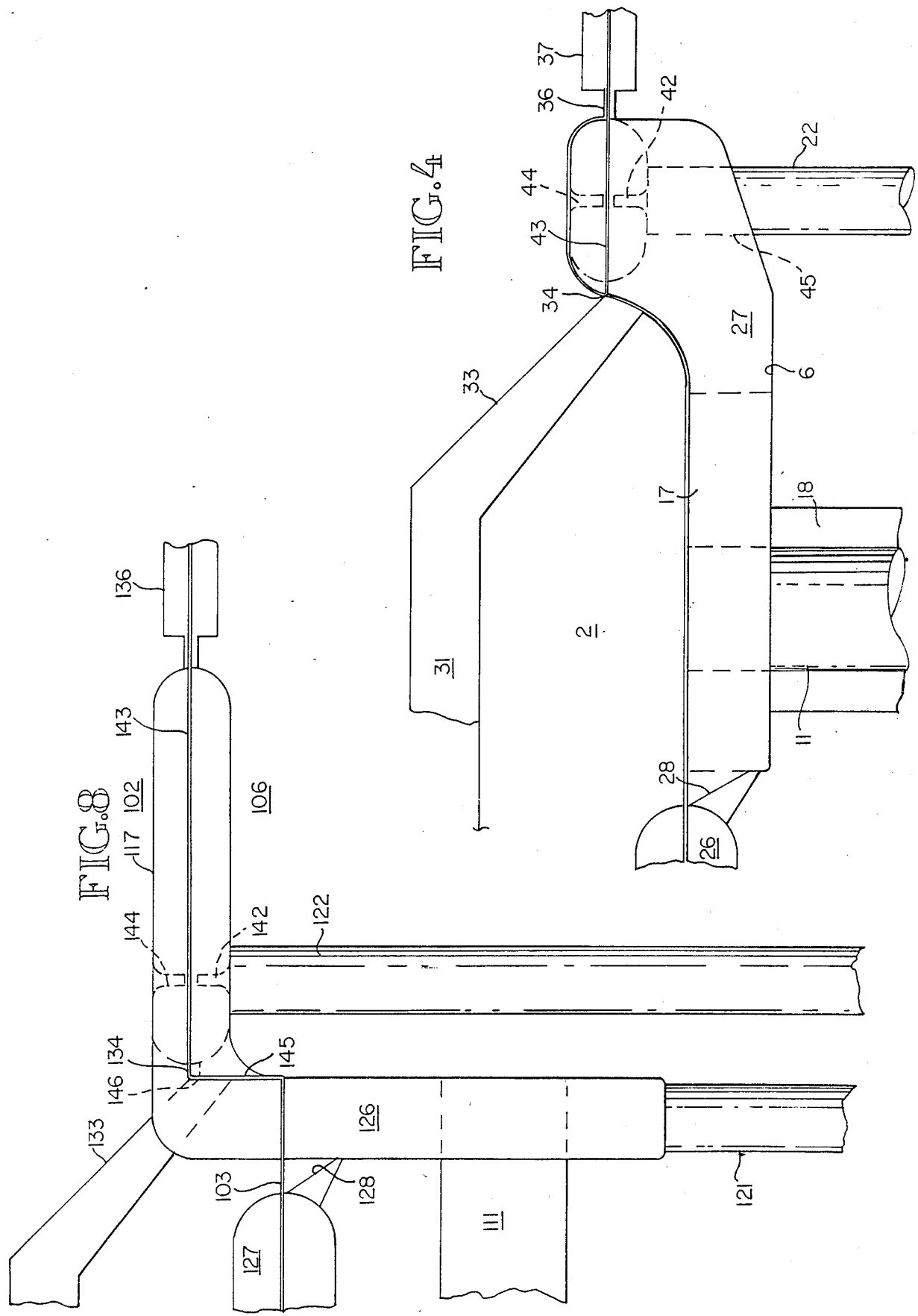

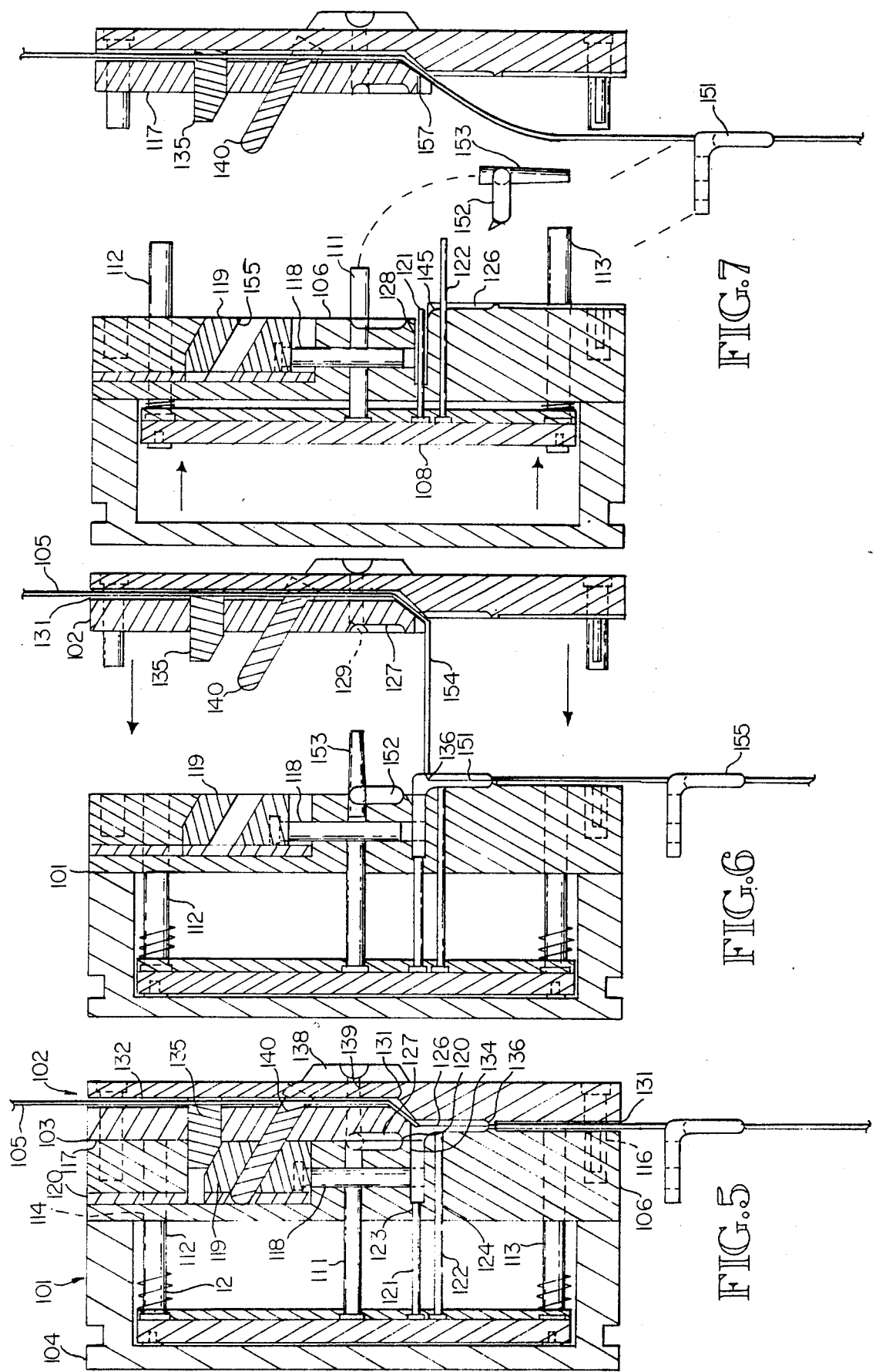

METHOD FOR MOLDING ARTICLES TO A WEB

FIELD OF THE INVENTION:

This invention pertains to injection molding, particularly to injection molding of parts onto a flexible web. pertains with still greater particularity to methods for molding a plurality of separate parts in a continuous process when the parts include a flexible portion and a relatively stiff portion.

BACKGROUND OF THE INVENTION:

Injection molding of various articles has been known for a considerable amount of time. In many cases it is desirable to attach an injection molded material to a web of flexible material Examples include such articles as belts with attached buckles, cable ties with mountings and various types of zippers.

The conventional methods of fabricating items such as these commonly involve several steps. An example is found in manufacture of straps with attached buckles. The buckle is usually injection molded in a multi-part mold. Examples of such buckles are found in U.S. Pat. Nos. 4,150,464 and 4,171,555. The next step is cutting of a length of flexible material to a desired length. The flexible material is then laced through the buckle to form an attachment. A common variation is sewing the flexible material to itself to form a connection to the buckle.

At various times attempts have been made to simplify the above process including gluing the material together rather than sewing. In the case of zippers ultrasonic welding has been used to attach molded parts to a web.

Due to the expense of the above processes the manufacture of parts having dissimilar materials has been limited to relatively high value parts.

Accordingly, there is a demand for a method and apparatus capable of manufacturing such parts in a single step.

SUMMARY OF THE INVENTION:

The invention provides a method and apparatus for the simultaneous molding of a part, attachment of the part to a continuous web, and cutting of the web to a predetermined length. The web can include such materials as cloth tapes or tubes as well as braided or laid ropes. The process is automatic and requires minimal supervision. This process provides parts having dissimilar materials at a cost far less than that of conventional manufacture. The process is adaptable to produce the parts either as individual parts or in an easy to manage roll form.

The primary part of the invention is a specially constructed tool or mold. This tool includes entrances for the admission of the web and the material to be molded in liquid form. The tool is constructed of two separable pieces such that the line of separation is collinear with the path of the web. The tool is further provided with a cavity in the shape of the desired molded portion of the final article. Means are provided in the tool to center the web in a predetermined position for proper adhesion. The mold further includes separation means for cutting or perforating the web. The tool is constructed in such a manner as to trim the molded portion of the article of waste such as sprue and runner. The tool is constructed in such a manner as to utilize the usual mold opening means to pull the web through the tool and control the length of web advanced. The tool includes the usual ejector pins.

A second embodiment of the tool includes an additional part. This part allows the molding of parts which are not substantially collinear with the web. The part aids in the extraction of the finished part from the tool.

The method and apparatus provides a simple one step process for fabrication of molded articles on a flexible web.

BRIEF DESCRIPTION OF THE FIGURES

FIG. 1 is a section elevation view of the tool during the injection stage of the process.

FIG. 2 is a section elevation view of the tool during the opening stage of the process.

FIG. 3 is a section elevation view of the tool during the ejection stage of the process.

FIG. 4 is a section elevation detail view of FIG. 1.

FIG. 5 is a section elevation view of a second embodiment of the tool during the injection stage of the process.

FIG. 6 is a section elevation view of a second embodiment of the tool during the opening stage of the process.

FIG. 7 is a section elevation view of a second embodiment of the tool during the ejection stage of the process.

FIG. 8 is a section elevation detail view of FIG. 5.

DETAILED DESCRIPTION OF THE FIGURES:

FIG. 1 is a section elevation view of the tool during the injection stage of the process. While only one cavity is shown in the tool it is presumed that tools will be constructed with multiple cavities. The tool includes two sides 1 2 separated by a junction 3. Side 1 of the tool is in turn composed of two major pieces, an ejector housing 4 and a mold face 6. A web of flexible material 5 passes through the tool. In the cavity between ejector housing 4 and mold face 6 is the ejector mechanism 7. The ejector mechanism 7 includes an ejector plate 8 and an ejector retainer plate 9. Pins 10 keep sides 1 and 2 in alignment. Plates 8 and 9 include holes for passage of core pin 11 which is connected to ejector housing 4 on one end and butts up against surface 17 of side 2 on the other end. An ejector sleeve 18 is fastened to plate 9 on one end and extends through a hole 19 in mold face 6 to the surface of mold face 6. Sleeve 18 is concentric with core pin 11. Two mold return pins 12 and 13 are connected to plates 8 and 9. Mold return pins 12 and 13 pass through holes 14 and 16 in mold face 6 and bear on surface 17 of side 2 in contact with junction 3. Springs 10 concentric around return pins 12 and 13 aid in operation of the tool. A sprue puller 21 and an ejector pin 22 are connected to plate 9 at one end and pass through holes 23 and 24 in mold face 6. A mold release mechanism (not shown) moves ejector plate 8 toward side 2 after opening of the tool. The mold release mechanism is of the type commonly used in the injection molding industry.

Mold face 6 is provided with a cavity 26 for accepting liquid material. Cavity 26 is in the shape of the buckle or attachment portion of the final part. A second cavity 27 is provided to provide a channel for passage of liquid material to cavity 26. The liquid material may be either a molten thermoplastic or a combination of plastic that hardens by chemical reaction such as epoxy resins or a thermosetting resin. The junction between cavities 26 and 27 is a tunnel gate 28. Gate 28 is cut into mold face 6 in such a manner as to leave a portion of material adjacent to junction 3. This type of gate is commonly known as a tunnel or submarine gate in the industry.

Side 2 includes surface 17 which is in contact with mold face 6 when the tool is in this position except for the areas of cavities 26 and 27 and a slot 31. Face 17 thus forms one side of cavities 26 and 27. Slot 31 provides an area for the passage of the web of flexible material 5. Slot 31 includes an area 32 where the flexible material 5 is situated entirely within side 2. Slot 31 then bends and reduces its thickness in area 33. Passing a narrow dam 34 slot enters cavity 26. Finally, slot 31 exits cavity 27 through a second dam 36 and runs 37 between mold face 6 and side 2. Side 2 is provided with a locating ring 38 for attachment to an injection molding machine (not shown) which provides a flow of liquid molding material. A channel 39 is attached to ring 38 to provide a route through side 2 to cavities 26 and 27 for the liquid material. Channel 39 is offset so as not to interfere with passage of flexible material 5 through slot 31 Optionally channel 39 may be a preformed sprue bushing. Pins 30 are provided to maintain alignment of web 5 in slot 31.

FIG. 4 a section detail of FIG. 1 shows the cavities and associated parts in greater detail. As described above liquid material enters cavity 27 first. The material then must pass the tunnel gate 28 before entering cavity 26. Cavity 26 is defined by surface 17 of side 2, the surface of mold face 6, the end 41 of ejection sleeve 18, the outer circumference of core pin 11, the end of pin 22, gate 28, and dams 34, and 36. During injection an area 43 of flexible material 5 is situated in cavity 26 between dams 34 and 36. The area of flexible material 43 is centered in cavity 27 by the specially formed surface 42 mold face 6 and an opposite surface 44 on surface 17. Front surface of mold face 6 is cut by a series of groove to create a ridge 42 which allows passage of liquid material yet firmly centers flexible material area 43. Surfaces 42 and 44 are so arranged so that the ridges formed are opposite and separated by the thickness of flexible material 5. While this embodiment shows only one set of ridges it is within the scope of this invention to provide multiple ridges if a longer length of flexible material 5 than 43 is desired to be entrapped in the final injection molded portion of the part. Dam 36 is provided so that the flexible material may pass unhindered while liquid material cannot. Dam 34 provides the same function but also includes an edge which pierces flexible material 5 by impact when the mold closes prior to the ejection step. A window 45 is provided in the molded part to allow dam 34 to pierce web 5 without interference. In the present embodiment the cut is not complete allowing the devices formed to be collected in a roll. If desired the edge could be complete and a bin provided to collect parts. Alternatively, the devices could pass an edge to separate the perforations after molding.

Returning to FIG. 1, in this position sides 1 and 2 are joined at junction 3 and a length of flexible material 5 is situated in slot 31 as described. The flexible material 5 already has perforations at dam 34 formed when sides 1 and 2 are joined. Liquid material is then injected through ring 38 into channel 39 and then into cavity 27. The liquid material then passes gate 28 and fills cavity 26 entrapping the portion of flexible material between dams 34 and 36. When all cavities are filled the injection step ends.

FIG. 2 is a section elevation view of the tool during the opening stage of the process. This stage follows directly after the injection stage shown in FIG. 1. During the opening stage side 1 is pulled away from side 2. The force for the pulling away is provided by the injection molding device (not shown). When side 1 is pulled away from side 2 the piece 51 molded stays with side 1. Attached to piece 51 are the sprue 53 and runner 52 which represent the molding material from channel 39 and cavity 27 respectively. Piece 51 remains with side 1 because the area adjacent to mold face 6 is larger than the area adjacent to side 17. Upon opening a length 54 of flexible material 5 is pulled through slot 31. Flexible material is centered by pins 30. This length is equal to the distance side 1 is removed from side 2. Since the length of removal is easily set by adjustment of the injection molding machine the length of 54 may also be easily adjusted. Length 54 is equal to the final length of flexible material attached to part 51. The part molded on the previous cycle 55 is also shown in position. When side 1 reaches the end of its travel the opening step is complete.

FIG. 3 is a section elevation view of the tool during the ejection stage of the process. During this stage ejector plate 8 is forced toward side 2. This motion in turn causes pins 12 and 13 to emerge from the surface of molding face 6. Pins 21, 22 and sleeve 19 also emerge from molding face 6 and eject piece 51 and sprue and runner 52,53 from molding face 6. Since a portion of the runner 52 is caught behind gate 28 the sprue 53 and runner break away from piece 51 and fall. A bin (not shown) may be provided for catching and recycling the sprues 53 and runners 52. Piece 51 falls in an arc away from face 6 into the position shown in FIG. 3. Completed parts are rolled up as produced (not shown). This finishes the ejection step. The tool is now returned to the FIG. 1 position.

On closing, face 17 of side 2 contacts pins 12 and 13 returning all plates and pins into the FIG. 1 position. Springs 10 aid in this action. This is because pins 12 and 13 are attached to plates 8 and 9 which are in turn attached to the ejector pin 22 and sprue puller 21 as well as ejector sleeve 19. Ejection pin 22 and ejector sleeve 19 and sprue puller 21 do not contact face 17 as they do not protrude as far from face 6 as pins 12 and 13. The edge on dam 36 pierces flexible material 5 at point 57 during the final contact of sides 1 and 2. The tool is now in the FIG. 1 position and the cycle continues until the desired amount of parts are made.

FIG. 5 is a section elevation view of a second embodiment of the tool during the injection stage of the process. While only one cavity is shown in the tool it is presumed that tools will be constructed with multiple cavities. The tool includes two sides 101,102 separated by a junction parting line 103. Side 101 of the tool is in turn composed of two major pieces an ejector housing 104 and a mold face 106. A web of flexible material 105 passes through the tool. In the cavity between ejector housing 104 and mold face 106 is the ejector mechanism 107. The ejector mechanism includes an ejector plate 108 and an ejector retainer plate 109. Plates 108 and 109 are slidable mounted by return pins 112 and 113 and a sprue puller 111. Return pins 112 and 113 pass through holes 114 and 116 in mold face 6 and bear on surface 117 of side 102 in contact with junction 103. Sprue puller 111 passes through hole 110. Two ejector pins 121 and 122 are connected to plate 109 at one end and pass through holes 123 and 124 in mold face 106. A mold release mechanism (not shown) moves ejector plate 108 toward side 102 on opening of the tool. The mold release mechanism is of the type commonly used in the injection molding industry.

Mold face 106 is provided with a cavity 126 for accepting liquid material. Cavity 126 is in the shape of the buckle or attachment portion of the final part. A second cavity 127 is provided to provide a channel for passage of liquid material to cavity 126. The junction between cavities 126 and 127 is a tunnel gate 128. Gate 128 is cut into mold face 106 in such a manner as to leave a portion of material adjacent to junction 103. This type of gate is commonly referred to as a submarine gate in the industry One end of a core pin 118 extends into cavity 126, core pin 118 provides a hole in the final product. The other end of core pin 118 not in cavity 126 is attached to a slider 119. Slider 119 is slidable mounted to mold face 106 by means of a groove or dove tail 120. Alternative means of slidable mounting could be substituted for dove tail 120.

Side 102 includes surface 117 which is in contact with mold face 106 when the tool is in this position except for the areas of cavities 126 and 127 and a slot 131. Face 117 thus forms one side of cavities 126 and 127. Slot 131 provides an area for the passage of the flexible material 105. Slot 131 includes an area 132 where the flexible material 105 is situated entirely within side 102. Slot 131 then bends and reduces its thickness in area 133. Passing a narrow dam 134 slot enters cavity 126. Finally, slot 131 exits cavity 126 through a second dam 136 and runs 137 between mold face 106 and side 102. Side 102 is provided with a locating ring 138 for attachment to an injection molding machine (not shown) which provides a flow of liquid molding material. A channel 139 is attached to locating ring 138 to provide a route through side 2 to cavities 126 and 127 for the liquid material. Channel 139 is offset so as not to interfere with passage of flexible material 105 through slot 131. Channel 139 may also be provided by a preformed sprue bushing. A cam lock 135 attached to side 102 prevents motion of core pin 118 and slider 119 upon injection of liquid material into cavity 127. A angle pin or cam 140 is attached to side 102 at one end and fits into an angle hole 155 in slider 119 at the other end.

FIG. 8, a section detail of FIG. 5, shows the cavities and associated parts in greater detail. As described above, liquid material enters cavity 127 first. The material then must pass the tunnel gate 128 before entering cavity 126. Cavity 126 is defined by surface 117 of side 102, the surface of mold face 106, the outer circumference of core pin 111, the end of pin 122, gate 128 and dams 134 and 136. During injection, an area 143 of flexible material 105 is situated in cavity 126 between dams 134 and 136. The area of flexible material 143 is centered in cavity 127 by the specially formed surface of mold face 106 and a surface 144 on surface 117. Mold face 106 is cut by as series of grooves to form a ridge 142, which allows passage of liquid material yet firmly, centers flexible material area 143. Surfaces 142 and 143 are arranged so that the ridges formed are opposite and separated by the thickness of flexible material 105. While this embodiment shows only one set of ridges, it is within the scope of this invention to provide multiple ridges if a longer length of flexible material 105 than 143 is desired to be entrapped in the final injection molded portion of the part. Dam 136 is provided so that the flexible material may pass unhindered while liquid material cannot. Dam 134 provides the same function but also includes an edge which pierces flexible material 105 by impact when the mold closes prior to the injection step. Dam 134 includes a plurality of grooves 146 to perforate rather than totally sever web 105. A window 145 is provided in the molded part to allow edge 146 to pierce web 105 without interference. In the present embodiment, the cut is not complete allowing the devices formed to be collected in a roll. If desired, the edge could be complete and a bin provided to collect parts. Alternatively, the devices could pass an edge to separate the perforations after molding.

Returning to FIG. 5, in this position, sides 101 and 102 are joined at junction parting line 103 and a length of flexible material 105 is situated in slot 131 as described. The flexible material 105 already has perforations at dam 134 formed when sides 101 and 102 joined. Liquid material is then injected through locating ring 138, into channel 139, and then, into cavity 127. The liquid material then passes gate 128 and fills cavity 126 entrapping the portion 143 of flexible material between dams 134 and 136. When all cavities are filled the injection step ends.

FIG. 7 is a section elevation view of the tool during the opening stage of the process. This stage follows directly after the injection stage shown in FIG. 5. During the opening stage, side 101 is pulled away from side 102. The force for the pulling away is provided by the injection molding device (not shown). When side 101 is pulled away from side 102, the piece 151 molded stays with side 101. Attached to piece 151 are the sprue 153 and runner 152 which, represent the molding material from channel 139 and cavity 127 respectively. Piece 151 remains with side 101 because the area adjacent to mold face 106 is larger than the area adjacent to side 117. When the tool opens, cam lock 135 is withdrawn from slider 119 allowing the force from cam or angle pin 140 to move slider 119 toward pin 112. As slider 119 moves, it causes the withdrawal of attached core pin 118 from piece 151. Upon opening, a length 154 of flexible material 105 is pulled through slot 131. This length 154 is equal to the distance side 101 is removed from side 102. This occurs because an area 143 of web 105 is caught in piece 151 which, is in turn attached to mold face 106. Since the length of removal is easily set by adjustment of the injection molding machine, the length of 154 may also be easily adjusted. Length 154 is equal to the final length of flexible material attached to part 151. The part molded on the previous cycle 155 is also shown in position. When side 1 reaches the end of its travel, the opening step is complete.

FIG. 8 is a section elevation view of the tool during the ejection stage of the process. During this stage ejector, plate 108 is forced toward side 102. This motion, in turn, causes return pins 112 and 113 to emerge from the surface of molding face 106. Ejector pins 121 and 122 and sprue puller 111 also emerge from molding face 106 and eject piece 151 and sprue and runner 152, 153 from molding face 106. Since a portion of the runner 152 is caught behind gate 128, the sprue 153 and runner break away from piece 151 and fall. A bin (not shown) may be provided for catching and recycling the sprues 153 and runners 152. Piece 151 falls in an arc away from face 106 into the position shown in FIG. 7. Completed parts are rolled up as produced (not shown). This finishes the ejection step. The tool is now returned to the FIG. 1 position.

On closing, face 117 of side 102 contacts pins 112 and 113 returning all plates and pins into the FIG. 1 position. This is because pins 112 and 113 are attached to plates 108 and 109 which are, in turn, attached to the ejector pins 122 and 124 and sprue puller 111. Ejector pins 124 and 122 and sprue puller 111 do not contact face 117 because they do not protrude as far from face 106 as return pins 112 and 113. Cam or angle pin 140 enters into a hole 155 in slider 119 and forces slider 119 toward pin 113. This motion forces core pin 118 into cavity 126. Cam lock 135 contacts slider 119 and prevents further motion. The ridge 146 pierces flexible material 105 at point 157 during the final contact of sides 101 and 102. The tool is now in the FIG. 5 position and the cycle continues until the desired amount of parts are made.

The above description is exemplary only and the invention is defined solely by the subjoined claims.

I claim:

1. A process for molding parts onto portions of a continuous web of flexible material with a mold having separable sides defining a mold cavity comprising the steps of:

separating the mold sides a distance equal to the desired distance between molded parts and thereby, drawing a portion of the web to extend between the separated mold sides by pulling the web through one side of the mold, such pulling being accomplished by the separation of the mold sides because the web is attached to one side of the mold and free to move through the other side of the mold;

ejecting a previously molded part from the mold; then closing the mold while positioning said portion of the web in the mold cavity; then injecting into the mold cavity and onto the web a liquid material which hardens into the shape of the mold cavity; and then repeating said process steps until the desired number of parts are produced.

2. The process of claim 1, further comprising a piercing step prior to said ejection step.

3. The process of claim 2, wherein said piercing step completely severs said web.

4. The process of claim 2, wherein said piercing step pierces said web for producing perforations for subsequent separation of the web.

5. The process of claim 1, wherein said drawing step further comprises a step of centering said web in the center of said mold.

6. The process of claim 1, wherein said separating step further comprises an enabling step for facilitating a later ejecting step.

7. The process of claim 1, wherein said ejecting step further comprises a trimming step for trimming a sprue or runner formed during said injecting step.

* * * * *